US012611757B2

(12) United States Patent
Nagao et al.

(10) Patent No.: US 12,611,757 B2
(45) Date of Patent: Apr. 28, 2026

(54) DRIVING TOOL

(71) Applicant: MAKITA CORPORATION, Anjo (JP)

(72) Inventors: Masaya Nagao, Anjo (JP); Kazusa Fukuda, Anjo (JP)

(73) Assignee: MAKITA CORPORATION, Anjo (JP)

(*) Notice: Subject to any disclaimer, the term of this patent is extended or adjusted under 35 U.S.C. 154(b) by 0 days.

(21) Appl. No.: 18/904,184

(22) Filed: Oct. 2, 2024

(65) Prior Publication Data

US 2025/0135615 A1 May 1, 2025

(30) Foreign Application Priority Data

Nov. 1, 2023 (JP) ................................ 2023-187522

(51) Int. Cl.

| | |
|---|---|
| ***B23Q 11/10*** | (2006.01) |
| ***B25C 1/06*** | (2006.01) |
| *B25C 1/00* | (2006.01) |
| *B25C 1/04* | (2006.01) |

(52) U.S. Cl.
CPC ................ *B25C 1/06* (2013.01); *B25C 1/008* (2013.01); *B25C 1/047* (2013.01)

(58) Field of Classification Search
CPC ............................ B23Q 11/1092; B23Q 11/10
USPC .......................................................... 227/129
See application file for complete search history.

(56) References Cited

U.S. PATENT DOCUMENTS

| | | | | |
|---|---|---|---|---|
| 11,207,768 B2 * | 12/2021 | Enta | B23Q 11/1092 | |
| 11,752,609 B2 * | 9/2023 | Baba | B25C 1/047 | 227/8 |
| 2009/0090759 A1 * | 4/2009 | Leimbach | B25C 1/06 | 227/10 |
| 2017/0326715 A1 * | 11/2017 | Chen | B25C 1/04 | |
| 2018/0154505 A1 * | 6/2018 | Sato | B25C 1/06 | |
| 2021/0138622 A1 * | 5/2021 | Enta | B25C 1/047 | |

FOREIGN PATENT DOCUMENTS

| | | |
|---|---|---|
| JP | 6780772 B2 | 11/2020 |
| JP | 2022-118835 A | 8/2022 |

* cited by examiner

*Primary Examiner* — Praachi M Pathak
(74) *Attorney, Agent, or Firm* — Oliff PLC

(57) ABSTRACT

A driving tool includes a holder attached to a wheel, grease reservoirs on the holder, magnets for detecting a rotation position of the wheel, and grease flow passages for flowing grease. The holder is rotatably integrated with the wheel. The grease in the grease reservoirs flows to a supporting hole via a tilting surface of a wall, an opening hole, an extension groove and a penetrating groove.

19 Claims, 9 Drawing Sheets

DRIVING TOOL

CROSS-REFERENCE TO RELATED APPLICATION

This application claims priority to Japanese patent application serial number 2023-187522, filed on Nov. 1, 2023, the contents of which are incorporated herein by reference in their entirety for all purposes.

TECHNICAL FIELD

The present invention generally relates to a driving tool for driving a driving member, such as a nail or a staple, into a workpiece, such as, for example, a wooden material.

BACKGROUND

For example, a driving tool which includes a piston that moves in a driving direction utilizing a pressured gas and also includes a driver that is combined with the piston to strike a driving member, such as a nail or a staple, is known. The driver that has reached a lower end position in the driving direction returns upward to a standby position due to a rotation of the wheel that is driven by a motor. The driver is provided with a plurality of engaging teeth along the driving direction. The driver returns upward from the lower end position to the standby position by successive engagement of the plurality of engaging teeth of the driver with engagement portions of a rotating wheel.

In order to obtain durability of the driving tool, it is necessary to apply an adequate amount of a lubricant to the engagement portions of the wheel that engage the engaging teeth of the driver. A lubricant-impregnated material for applying a lubricant to the engagement portions is known. Further, a grease reservoir for applying a lubricant to the engagement portions is known. However, there is a need for another configuration that can apply an adequate amount of the lubricant in order to obtain further improved durability of the engagement portions of the wheel.

SUMMARY OF THE DISCLOSURES

According to one aspect of the present disclosure, a driving tool comprises a driver that moves in a driving direction to drive a driving member and a wheel including a plurality of engagement portions that engage the driver. The driving tool also comprises an electric motor that rotates the wheel to move the driver in a direction opposite to the driving direction via the plurality of engagement portions. The driving tool also comprises a holder attached to the wheel and a grease reservoir formed in the holder. The driving tool also comprises a grease flow passage that connects the grease reservoir and at least one of the plurality of engagement portions which engages the driver at a standby position.

Because of this configuration, an adequate amount of grease can be stored in the grease reservoir in the holder. At lease when the driver is at a standby position, the grease flows from the grease reservoir to the engagement position which engages the driver, via the grease flow passage. Accordingly, an adequate amount of grease is supplied to the engagement portion, thereby improving durability of the wheel.

According to another aspect of the present disclosure, a driving tool comprises a driver that moves in a driving direction to drive a driving member, and a wheel including a plurality of engagement portions that engage the driver. The driving tool also comprises an electric motor that rotates the wheel to move the driver in a direction opposite to the driving direction via the plurality of engagement portions. The driving tool also comprises a holder that is attached to the wheel and includes a grease reservoir. The driving tool also comprises a magnet arranged on the holder for detecting a rotation of the wheel.

Because of this configuration, the grease reservoir is formed in the holder to which the magnet for detecting the rotation position of the wheel. An adequate amount of grease is stored in the grease reservoir in the holder. The grease in the grease reservoir flows to the engagement portion. Accordingly, an adequate amount of grease is supplied to the engagement portion, thereby improving durability of the wheel.

DETAILED DESCRIPTION

Figure 1:
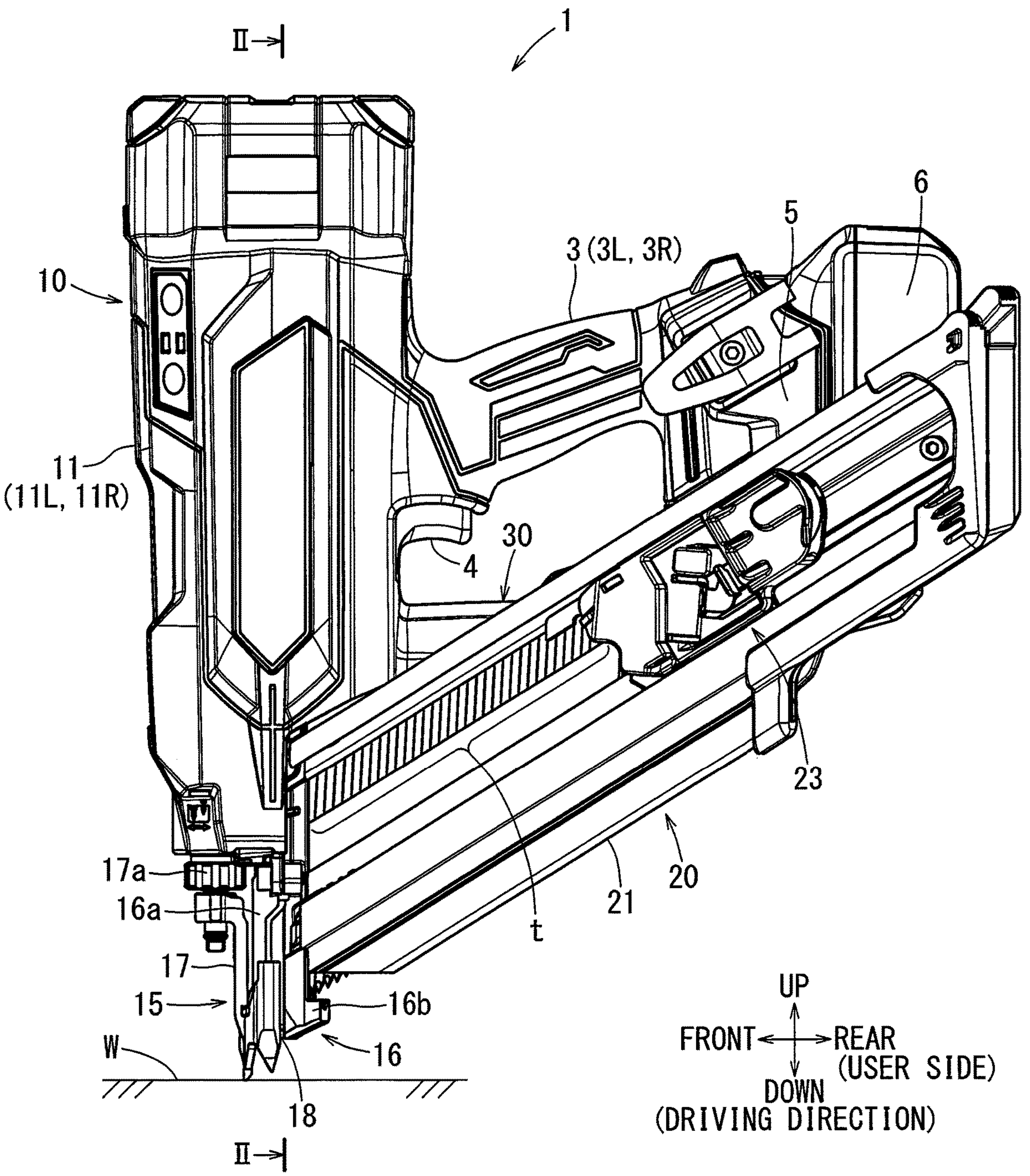
FIG. 1 is a left side view of a driving tool according to an exemplary embodiment of the present disclosure.

The detailed description set forth below, when considered with the appended drawings, is intended to be a description of exemplary embodiments of the present disclosure and is not intended to be restrictive and/or representative of the only embodiments in which the present disclosure can be practiced. The term “exemplary” used throughout this description means “serving as an example, instance, or illustration,” and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

According to another aspect of the present disclosure, the wheel includes supporting holes for inserting the plurality of engagement portions, and the grease flow passage includes a first grease flow passage having an extension groove being arranged on an outer surface of the wheel facing the holder and extending from one of the supporting holes. Because of this configuration, the grease in the grease reservoir is supplied to the supporting hole via the extension groove.

According to another aspect of the present disclosure, the extension groove extends in an arc-shape centered at a rotation center of the wheel. Furthermore, the first grease flow passage includes a penetrating groove for penetrating the wheel from the extension groove along an inner circumferential surface of the supporting hole. Because of this configuration, the grease can be reliably supplied to the supporting hole via the penetrating groove.

According to another aspect of the present disclosure, the wheel includes supporting holes for inserting the plurality of engagement portions. Furthermore, the grease flow passage includes a second grease flow passage having a recess arranged on an outer surface of the wheel facing the holder and a first communicating hole connected to the recess. The first communicating hole is opened toward the one of the plurality of engagement portions. Because of this configuration, the grease in the grease reservoir can be supplied to the supporting hole via the recess and the first communicating hole which serve as the second grease flow passage.

According to another aspect of the present disclosure, a tilting surface is formed at a circumferential end of the grease reservoir so as to be tilted relative to a depth direction of the grease reservoir. The tiling surface extends along the grease flow passage. Because of this configuration, the grease in the grease reservoir smoothly flows along the tilting surface in the grease flow passage.

According to another aspect of the present disclosure, the holder includes a magnet for detecting a rotation position of the wheel. Because of this configuration, the rotation position of the holder can be detected by the magnet.

According to another aspect of the present disclosure, the driving tool further comprises a cover between the wheel and the holder for covering the grease reservoir. The cover includes a hole being a part of the grease flow passage for flossing grease to the one of the plurality of engagement portions. Because of this configuration, the grease in the grease reservoir is supplied to the engagement portion of the wheel via the hole of the cover.

According to another aspect of the present disclosure, the cover includes an opening hole that is open to the extension groove of the wheel. The opening hole becomes a part of the first grease flow passage for flowing grease to the extension groove. Because of this configuration, the grease in the grease reservoir flows to the extension groove via the opening hole that forms a part of the first grease flow passage.

According to another aspect of the present disclosure, the cover includes a second communicating hole that is open to the recess of the wheel, and the second communicating hole becomes a part of the second grease flow passage for flowing grease to the recess. Because of this configuration, the grease in the grease reservoir flows to the recess via the second communicating hole that forms a part of the second grease flow passage.

According to another aspect of the present disclosure, the cover includes an opening hole that is open to the extension groove of the wheel that becomes a part of the first grease flow passage, and also includes a second communicating hole that is open to the recess of the wheel that becomes a part of the second flow passage. Because of this configuration, the grease in the grease reservoir flows not only to the opening hole that forms a part of the first grease flow passage but also to the second communicating hole that forms a part of the second grease flow passage.

A driving tool 1 according to an exemplary embodiment of the present disclosure will be explained with reference to FIGS. 1 to 11. In the embodiment, a gas-spring type driving tool 1 is exemplified as the driving tool 1. The gas-spring type driving tool 1 utilizes the pressure of a gas (elastic material or fluid) filled in an accumulation chamber 14 above a cylinder 12 as a driving force for driving a driving member t. The driving member t is formed in a bar shape such as, for example, a nail. In the following explanation, a driving direction of the driving member t is a downward direction. A direction opposite to the driving direction is an upward direction. In FIG. 1, a user is situated on a rear side of the driving tool 1 (on a side of the grip 3). A side opposite to the user side is referred to as a front side. A left/right side is based on a user's position.

Figure 2:
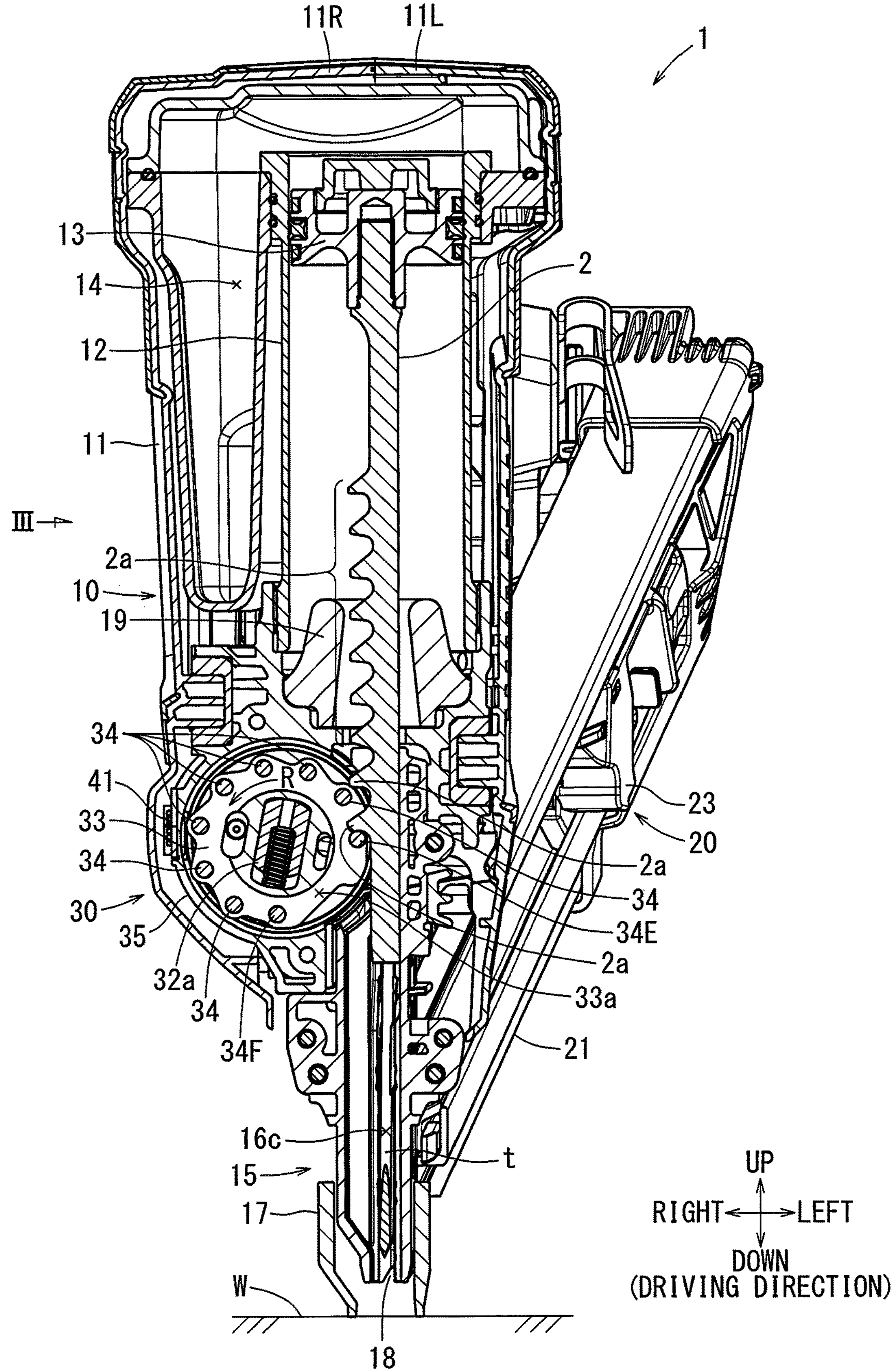
FIG. 2 is a cross-sectional view taken along line II-II of FIG. 1, showing a longitudinal cross-sectional view of a tool main body. In this figure, a driver is at a standby position.
Figure 3:
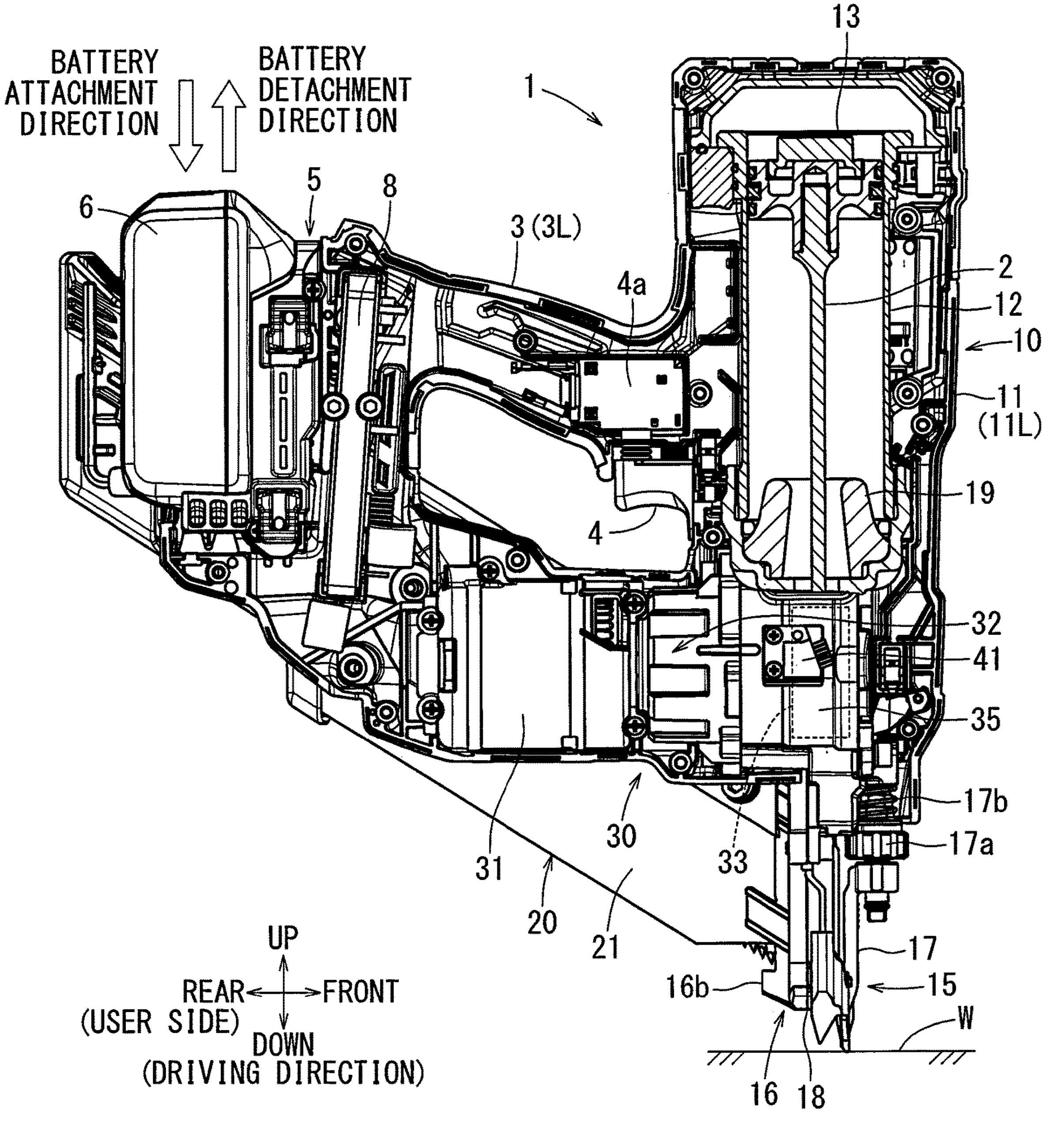
FIG. 3 is a right side view of the driving tool. This figure shows a state in which a right side half-split housing is removed from the tool main body and an interior of the tool main body is exposed.

As shown in FIGS. 1 to 3, the driving tool 1 includes a tool main body 10. The tool main body 10 includes a resin-made main body housing 11. The main body hosing 11 has a left/right half-split structure in which a left side half-split housing 11L faces a right side half-split housing 11R to screw-connect to each other. The main body housing 11 houses a cylinder 12. The cylinder 12 houses a piston 13 that is movable in an up-down direction. A driver 2 extending in a downward direction is combined to a center of a lower surface of the piston 13. A lower portion of the driver 2 enters within a driving passage 16*c* discussed later. An upper portion of the cylinder 12 above the piston 13 communicates with an accumulation chamber 14. A compressed gas such as, for example, an air, is filled in the accumulation chamber 14. The pressure of the gas filled in the accumulation chamber 14 is applied to an upper surface of the piston, which serves as a driving force.

A nose 15 is formed at a lower portion of the tool main body 10. The nose 15 includes a driver guide 16 and a contact arm 17. The driver guide 16 includes a front driver guide 16*a* on a front side and a rear driver guide 16*b* on a rear side. The front driver guide 16*a* is connected to the rear driver guide 16*b* to form the driver guide 16. A driving passage 16*c* is formed between the front driver guide 16*a* and the rear driver guide 16*b*. The driving passage 16*c* communicates with an inner circumferential side of the driving passage 16*c*. The driver 2 enters within the driving passage 16*c* so as be reciprocated in the up-down direction.

Figure 4:
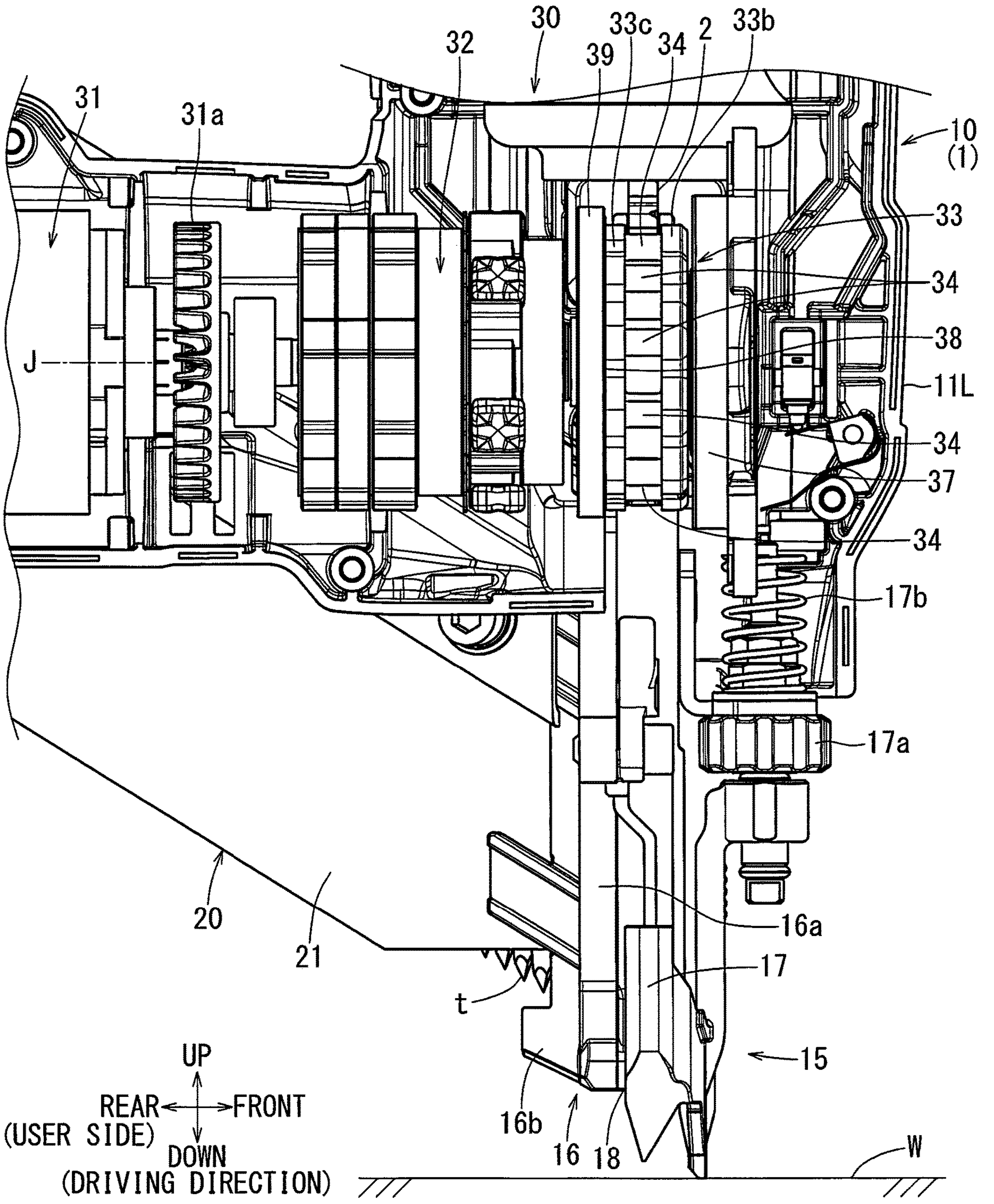
FIG. 4 is a right side view of a lift mechanism.

The contact arm 17 is supported so as to be movable in the up-down direction around the driver guide 16. The contact arm 17 extends upward from around a lower end (an ejection port 18) of the driver guide 16. As shown in FIGS. 3 and 4, the contact arm 17 is biased downward by a compression spring 17*b* toward a side of an off position. At the off position, a lower portion of the contact arm 17 is below the ejection port 18.

A pulling operation of a switch lever 4 becomes effective when the contact arm 17 is relatively moved upward with respect to a workpiece W (the contact arm 17 is on-operated). An adjustment dial 17*a* for adjusting a driving depth is provided below the compression spring 17*b*. An off position of the contact arm 17 can be adjusted in the up-down direction by rotating the adjustment dial 17*a*. This adjustment causes a stroke of the contact arm 17 to be changed, thereby adjusting a position of the ejection port 18 with respect to the workpiece W. In other words, a driving depth of a driving member t with respect to the workpiece W can be changed.

As shown in FIG. 1, a magazine 20 is combined to a rear surface of the nose 15. The magazine 20 is loaded with a plurality of driving members t. The magazine 20 includes a magazine main body 21 that houses the plurality of driving members t and a pusher 24 that pushes the plurality of driving members t toward the driving passage 16*c* in the nose 15. A driving member t, which is pushed by the pusher 23 and supplied within the driving passage 16*c*, is driven by the driver 2 moving downward, thereby ejecting the driving member t from the ejection port 18.

A grip 3 for a user to hold is formed on a rear surface side of the tool main body 10. The grip 3 has a half-split construction in which a left grip housing 3L and a right grip housing 3R, which are integrally formed in the main body housing 11, face to each other to be screw-connected. A switch lever 4 for activating the driving tool 1 is provided on a front lower surface of the grip 3. The switch lever 4 is pull-operated by a fingertip of the user. As shown in FIG. 3, a switch main body 4*a* is arranged above the switch lever 4. When the switch lever 4 is pull-operated upward, the switch main body 4*a* is turned on. When the switch main body 4*a* is turned on, power is supplied to a lift mechanism 30. The lift mechanism 30 will be discussed later in detail.

As shown in FIG. 3, a battery attachment portion 5 is formed on a rear side of the grip 3. A battery 6 is attached to the battery attachment portion 5. The battery 6 is slid downward to attach to the battery attachment portion 5. On the contrary, the battery 6 is slide upward to detach from the battery attachment portion 5. The battery 6 detached from the attachment portion 5 can be recharged by using a dedicated charger for repeated use. The battery 6 can be used for other driving tools. An electric motor 31 of the lift mechanism 30 is driven by the battery 6 as a power source.

As shown in FIG. 3, a rectangular-plate shaped controller 8 is housed in the battery attachment 5. The controller 8 is arranged extending in the up-down direction along a front surface side of the battery 8. When both of an on-operation of the switch lever 4 and an on-operation of the contact arm 17 are performed, the lift mechanism 30 is activated to start a driving operation of the driving tool 1. The controller 8 mainly controls the lift mechanism 30, especially the electric motor 31.

As shown in FIG. 2, a lower end damper 19 for absorbing an impact of the piston 13 at the lower end position is disposed at a lower portion of the cylinder 12. A lower portion of the driver 2 enters within the driving passage 16*c* through an inner circumferential side of the lower end damper 19. The driver 2 moves downward within the driving passage 16*c* by the pressure of a gas filled in the accumulation chamber 14 that is applied to the upper surface of the piston 13. A tip end (lower end) of the driver 2 moving downward within the driving passage 16*c* drives a driving member t that is supplied within the driving passage 16*c*. The driving member t driven by the driver 2 is ejected from the ejection port 18. The ejected driving member t is driven into the workpiece W.

The lift mechanism 30 is arranged below the grip 3. The lift mechanism 30 includes the electric motor 31. A wheel 33 is supported in front of the electric motor 31 via a reduction gear train 32. The wheel 33 is covered with a mechanism case 35. The driver 2 that has reached the lower end position moves upward (in a direction opposite to the driving direction of the driving member t) together with the piston 13 to a standby position by the lift mechanism 30. The wheel 33 is supported by an output shaft 32*a* of the reduction gear train 32. The wheel 33 rotates in a direction indicated by an arrow R in FIG. 2 (counterclockwise in this figure). By this rotation of the wheel 33, the driver 2 moves (returns) upward (in a direction opposite to the driving direction).

As shown in FIG. 2, the driver 2 includes, for example, nine engaging teeth 2*a* which are formed on a right side of the driver 2. Each of the engaging teeth 2*a* has a rack-tooth shape protruding rightward. A plurality of engaging teeth 2*a* are arranged at equal intervals in a longitudinal direction of the driver 2 (in the up-down direction). The wheel 33 of the lift mechanism 30 successively engages the plurality of engaging teeth 2*a*.

As shown in FIG. 2, the wheel 33 is arranged on a right side of the driver 2. The wheel 33 includes, for example, nine engagement portions 34 that successively engage the engaging teeth 2*a* of the driver 2. A cylindrical-shaped shaft member is used for each of the engagement portions 34. The nine engagement portions 34 are arranged at equal intervals along an outer circumferential edge of the wheel 33. Rotation of the wheel 33 in a direction indicated by an arrow R causes a first engagement portion 34F of the wheel 33 to engage an uppermost engaging tooth 2*a* of the driver 2 that has reached the lower end position. A last engagement portion of the wheel 33 that engages a lowermost engaging tooth 2*a* of the driver 2 is assigned to an engagement portion 34E. The engagement portions 34F and 34E will be used in order to distinguish them from other engagement portions 34 when necessary. The last engagement portion 34E engages the engagement tooth 2*a* of the driver 2 when the driver 2 is at the standby position. When the driver 2 moves upward from the standby position to an upper end position, the engagement portion 34E disengages from the engaging tooth 2*a*. At this point, a large load is applied to the last engagement portion 34E. Because of this configuration, it is especially necessary to apply an adequate lubricant to the last engagement portion 34E for durability.

The wheel 33 rotates in a direction indicated by an arrow R by activation of the electric motor 31. After the driver 2 reaches the lower end position to drive a driving member t, the wheel 33 continues to rotate in the direction indicated by the arrow R to cause the engagement portions 34 to successively engage the engaging teeth 2*a* from below, thereby moving the driver 2 upward. When the piston 13 moves upward by the lift mechanism 30, the pressure of the gas filled in the accumulation chamber 14 increases. When the driver 2 returns to the standby position shown in FIG. 2 (a position where the last engagement portion 34E engages the engaging tooth 2*a* of the driver 2), the electric motor 31 stops. At this stage, a series of a driving operation is completed.

When the switch lever 4 is pull-operated again, the lift mechanism 30 is activated again. When the lift mechanism 30 is activated, the wheel 33 starts to rotate in the direction indicated by the arrow R to move the driver 2 and the piston 13 upward from the standby position, thereby causing the last engagement portion 34E of the wheel 33 to disengage from the engaging tooth 2*a* of the driver 2.

As shown in, for example, FIG. 2, a large area is formed between the first engagement portion 34F and the last engaging portion 34E in a rotation direction of the wheel 33 indicated by the arrow R. This area is referred to as a relief area 33*a*, which does not include the engagement portions 34. When the wheel 33 rotates in the direction indicated by the arrow R to cause the relief area 33*a* to face a side of the driver 2, an engagement of the wheel 33 with the engaging teeth 2*a* of the driver 2 is released. Because of this, the driver 2 and the piston 13 move downward without interference of the engagement portions 34 owing to the pressure of the gas filled in the accumulation chamber 13 which is applied to an upper surface of the piston 13. When the driver 2 moves downward through the driving passage 16*c*, the driver 2 drives the driving member t into the workpiece W.

As shown in FIG. 4, the electric motor 31, the reduction gear train 32 and the wheel 33 are coaxially arranged around a motor shaft axis line J. A cooling fan 31*a* is supported on an output shaft of the electric motor 31. The reduction gear train 32 includes a three-staged planetary gear train. The wheel 33 is supported by an output shaft 32*a* of the three-staged planetary gear train.

Figure 5:
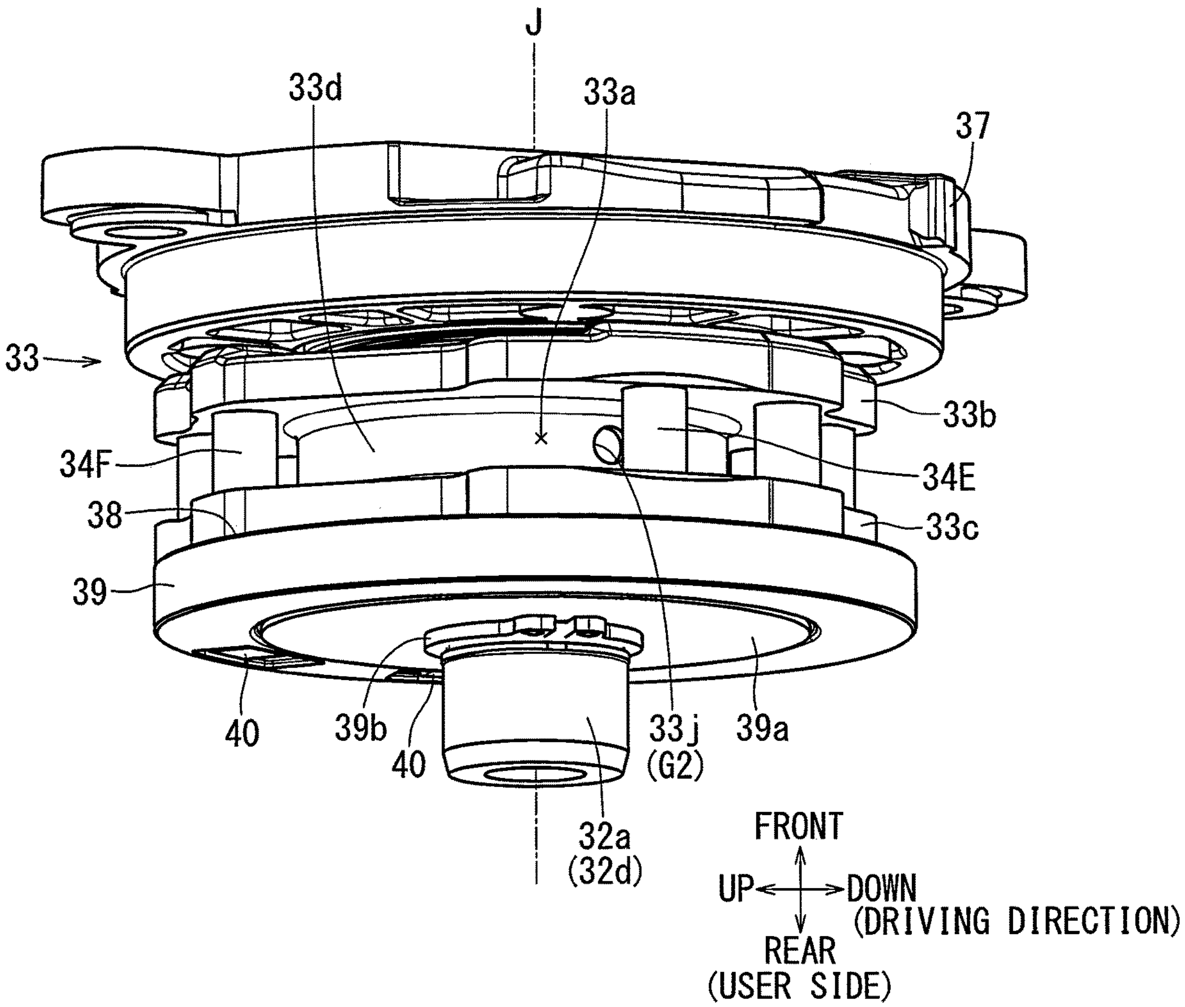
FIG. 5 is a perspective view of the lift mechanism.
Figure 6:
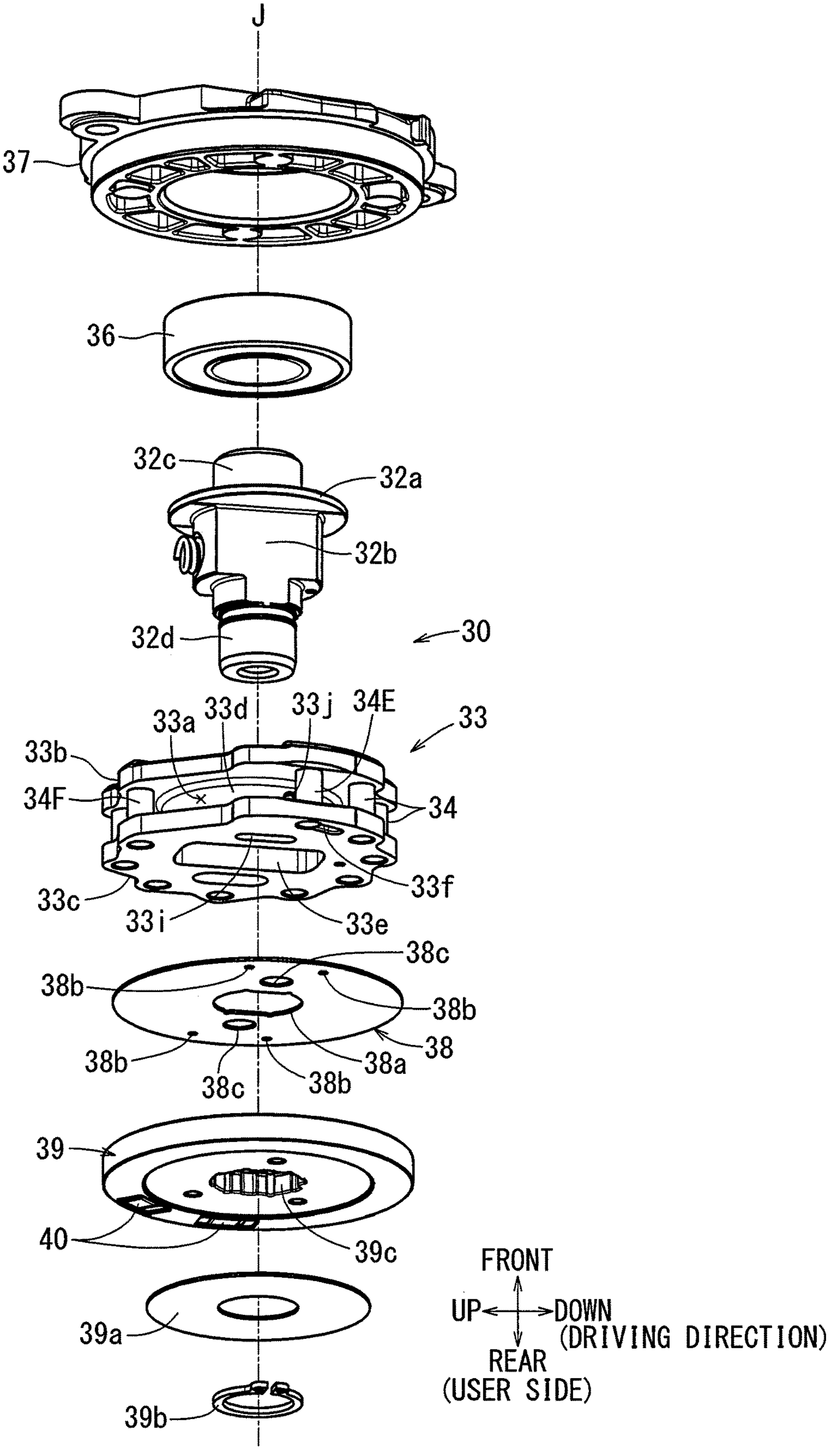
FIG. 6 is an exploded perspective view of the lift mechanism.
Figure 8:
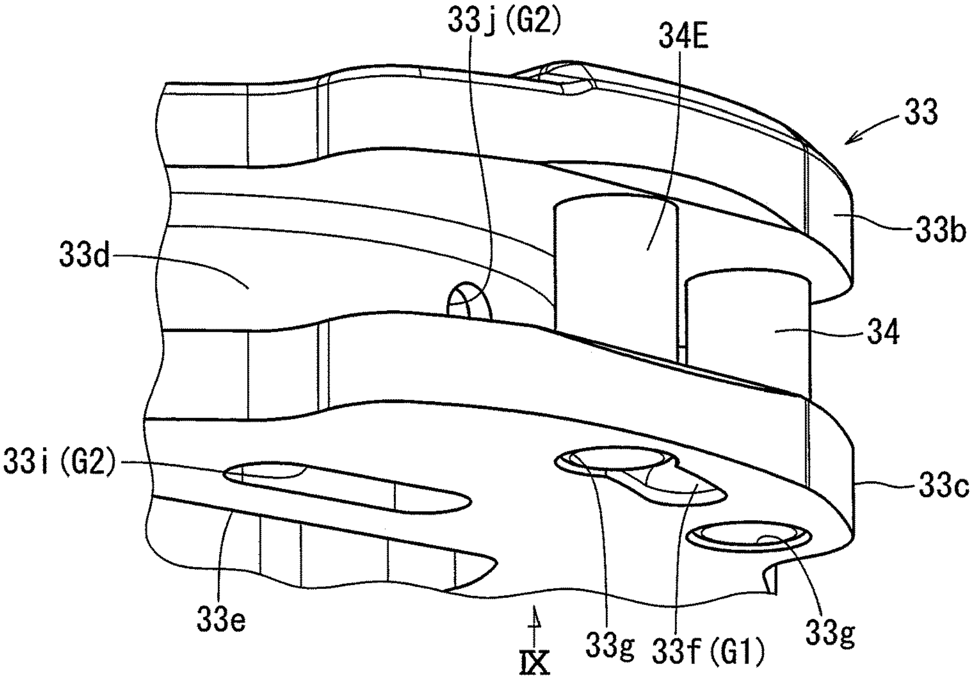
FIG. 8 is a perspective view of a wheel viewed from a rear surface side thereof.

As shown in FIGS. 5, 6 and 8, the wheel 33 includes a front flange 33*b* on a front side and a rear flange 33*c* on a rear side. The front flange 33*b* and the rear flange 33*c* are integrally connected to each other via a cylindrical-shaped coupling member 33*d*. The front flange 33*b* and the rear flange 33*c* are arranged in parallel with each other. A circumferential edge of the front flange 33*b* extends radially from the coupling member 33*d*. Similarly, a circumferential edge of the rear flange 33*c* extends radially from the coupling member 33*d*. The nine engagement portions 34 in total are arranged between the circumferential edge of the front flange 33*b* and the circumferential edge of the rear flange 33*c*. One end of the engagement portion 34 is supported by the front flange 33*b* and the other end thereof is supported by the rear flange 33*c*. As shown in FIG. 8, both ends of each of the engagement portions 34 are inserted into supporting holes 33*g* formed in the front flange 33*b* and the rear flange 33*c* such that the engagement portions 34 are supported by the front and rear flanges 33*b*, 33*c*.

As shown in FIG. 2, the nine engagement portions 34 are arranged at substantially equal intervals around the motor shaft axis line J. Compared to the equal intervals of the nine engagement portions 34, an interval between the first engagement portion 34F and the last engagement portion 34E in the circumferential direction, i.e., a length of the relief area 33*a* in the circumferential direction, is made large. Referring to FIG. 6, an oval supporting hole 33*e* is formed in a center portion of the coupling member 33*d*. The output shaft 32*a* of the reduction gear train 32 is inserted into the supporting hole 33*e*. A plane portion 32*b* of the output shaft 32*a* is inserted into the supporting hole 33*e*. Because of this configuration, the wheel 33 rotates integrally with the output shaft 32*a* around the motor shaft axis line J. Further, the wheel 33 is supported so as to be displaceable in a specified range in a radial direction perpendicular to the motor shaft axis line J with respect to the output shaft 32*a*, referring to FIGS. 2 and 6.

Referring to FIG. 6, a front portion 32*c* of the output shaft 32*a* is rotatably supported by a front support plate 37 via a bearing 36. The front support plate 37 is screw-connected to a front portion of the mechanism case 35. The front portion of the mechanism case 35 is covered with the front support plate 37.

As shown in FIGS. 5 and 6, a cover 38 is supported on a side of a rear surface of the wheel 33. A holder 39 is supported on a side of a rear surface of the cover 38. The cover 38 and the holder 39 are formed in a circular shape. The cover 38 is held between the wheel 33 and the holder 39. A circular protecting plate 39*a* contacts a rear surface of the holder 39. A rear portion 32*d* of the output shaft 32*a* protrudes from the protecting plate 39*a*. A retaining ring 39*b* is attached to the rear portion 32*d*. Because of this configuration, the wheel 33, the cover 38 and the holder are supported so as not to be displaceable with each other in an axial direction with respect to the output shaft 32*a*. The plane portion 32*b* of the output shaft 32*a* is inserted into the supporting hole 33*e* of the wheel 33, a supporting hole 38*a* of the cover 38 and a supporting hole 39*c* of the holder 39. Accordingly, the wheel 33, the cover 38 and the holder 39 rotate integrally with the output shaft 32*a*.

Figure 7:
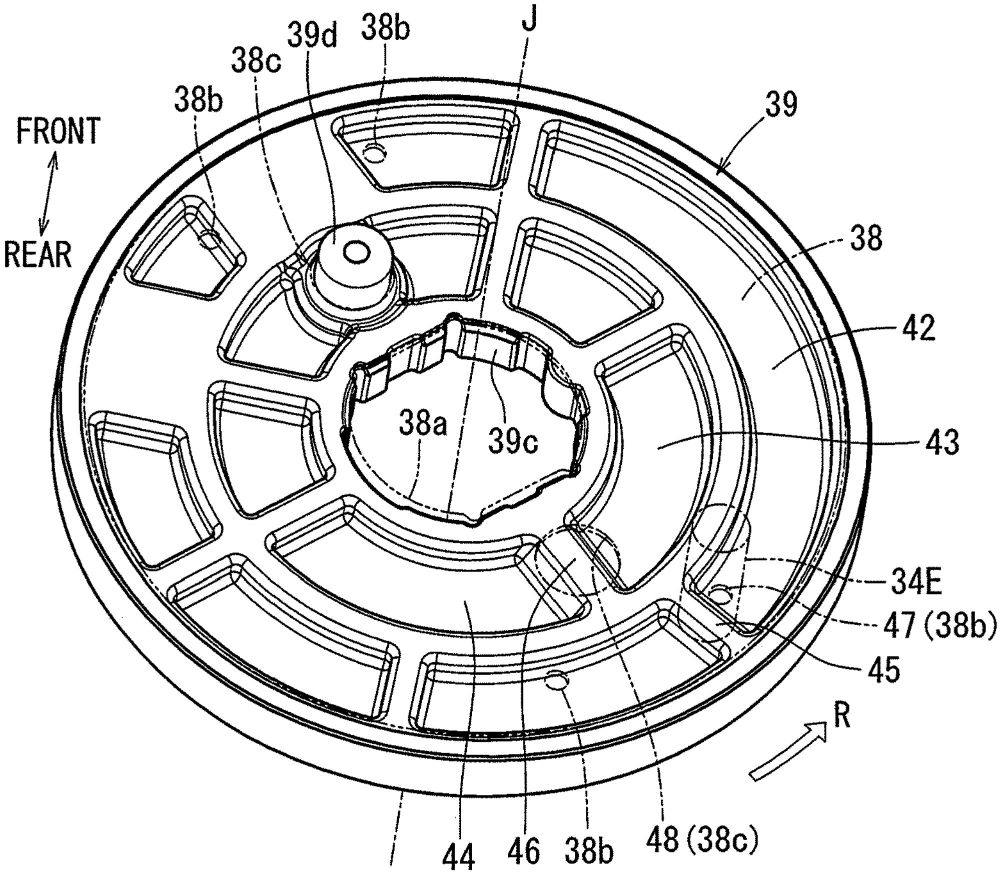
FIG. 7 is a perspective view of a holder viewed from a front surface side thereof.

As shown in FIG. 7, a plurality of recesses are formed on a front surface of the holder 39. The plurality of recesses include three grease reservoirs 42, 43, 44. An adequate amount of grease G is stored in the grease reservoirs 42, 43, 44. The grease reservoir 42 is on an outer circumferential side of the holder 39. The grease reservoirs 43, 44 are on an inner circumferential side of the holder 39. A rear portion of the grease reservoir 42 in the rotation direction R is partitioned from an adjacent recess with a wall 45. The wall 45 is arranged behind the last engagement portion 34E in the front-rear direction. A relative positional relationship between the last engagement portion 34E and the wall 45 does not change.

The grease reservoirs 42, 43, 44 and other recesses are covered with the cover 38. The cover 38 includes four small through-holes 38*b* and two large through-holes 38*c*, which are arranged symmetrically with respect to a center of the cover 38. One of the four small through-holes 38*b* of the cover 38 is served as an opening hole 47 that forms a part of a grease flow passage. As shown in FIG. 7, the opening hole 47 is positioned on a side close to the last engagement portion 34E and forwardly in the rotation direction R. The remaining three small through-holes 38*b* are served as dummy holes for an easy assembly of the holder 39 in the lift mechanism 30. In other words, the four small through-holes 38*b* including the opening hole 47 exclude a directivity of the cover 38 in an assembling procedure.

One of the two large through-holes 38*c* of the cover 38 is served as a communicating hole 48 that communicates with a recess 33*i* of the wheel 33, which is discussed later. The communicating hole 48 forms a part of a grease flow passage. As shown in FIG. 7, the cover communicating hole 48 is positioned on side of a wall 46. A cylindrical-shaped positioning protrusion 39*d* that is formed on a front surface of the holder 39 is inserted into the other large through-hole 38*c* positioned on a side opposite to the communicating hole 48. The two large through-holes 38 are arranged symmetrically with respect to the center of the cover 38, thereby excluding a directivity of the cover 38 in an assemble procedure.

Figure 10:
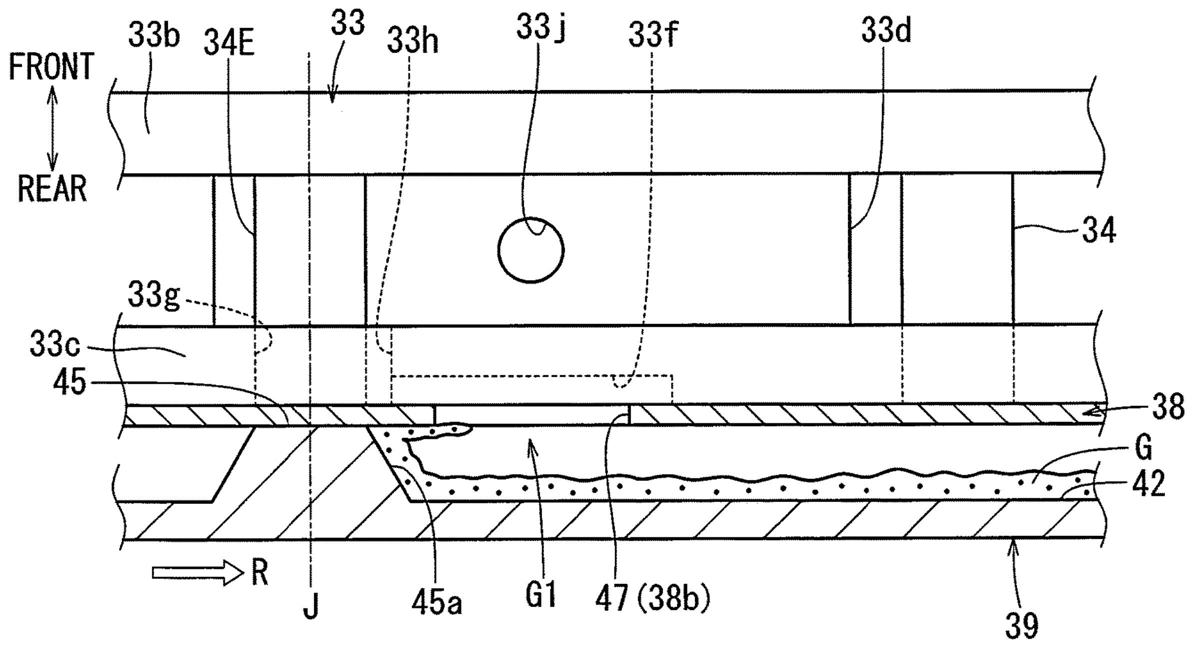
FIG. 10 is a longitudinal cross-sectional view of a first grease flow passage.

As shown in FIG. 10, the wall 45 includes a tilting surface 45*a*, which is on a frontward side in the rotation direction R. The tilting surface 45*a* is tilted relative to a depth direction of the grease reservoir 42. Also, the tilting surface 45*a* is tilted toward a downstream direction of the grease flow passage (on a side of the opening hole 47 of the cover 38).

Figure 9:
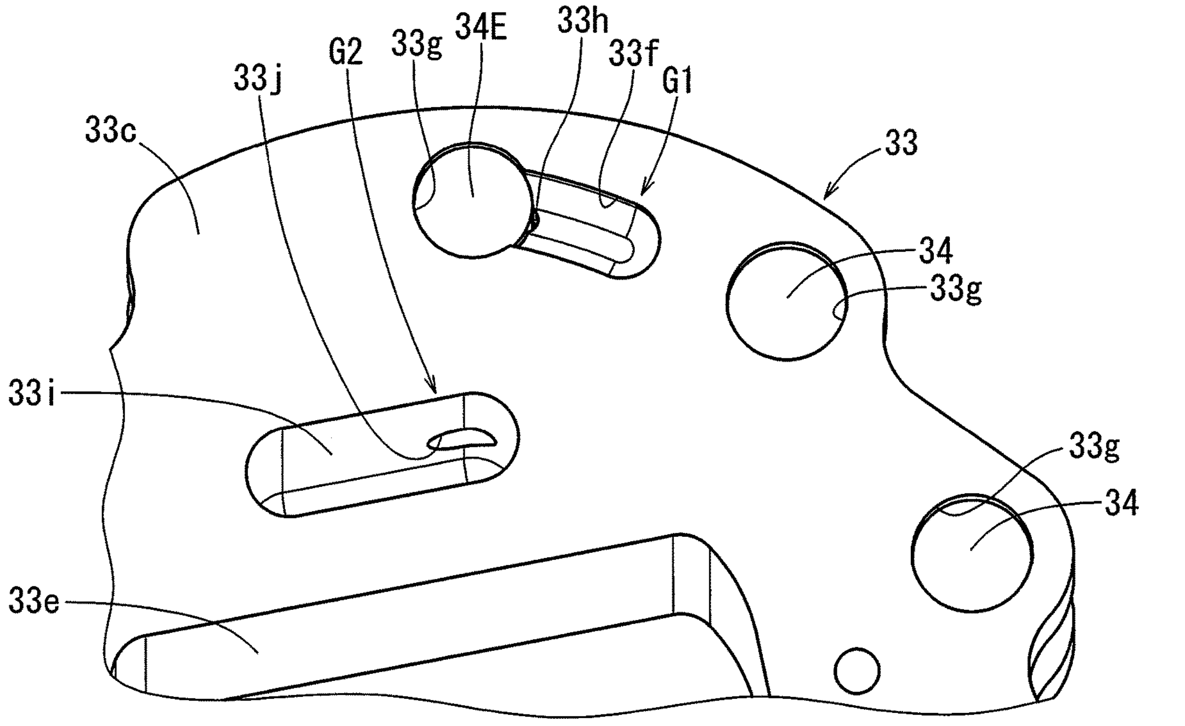
FIG. 9 is a perspective view of the wheel viewed from a direction indicated by an arrow IX in FIG. 8.

As shown in FIGS. 8-10, an arc-shaped extension groove 33*f* is formed on a rear surface of the rear flange 33*c* of the wheel 33. The extension groove 33*f* extends from the supporting hole 33*g*, into which the engagement portion 34E is inserted, along the rear surface of the rear flange 33*c*. Further, as clearly shown in FIG. 10, a penetrating groove 33*h* extends from the extension groove 33*f* along an inner circumferential surface of the supporting hole 33*g*. The penetrating groove 33*h* passes through the rear flange 33*c*. The extension groove 33*f* and the penetrating groove 33*h* are served as a grease flow passage.

As shown in FIG. 7, grease G flows from the grease reservoir 42 to the opening hole 47 via the tilting surface 45*a*. The grease G flowing to the opening hole 47 flows within the supporting hole 33*g* via the extension groove 33*f* and the penetrating groove 33*h*. Because of this configuration, the lubrication to the engagement portion 34E can be performed. The grease reservoir 42, the tilting surface 45*a* of the wall 45, the opening hole 47, the extension groove 33*f*, the penetrating groove 33*h* and the supporting hole 33*g* form a first grease flow passage G1 for lubricating the engagement portion 34E.

Figure 11:
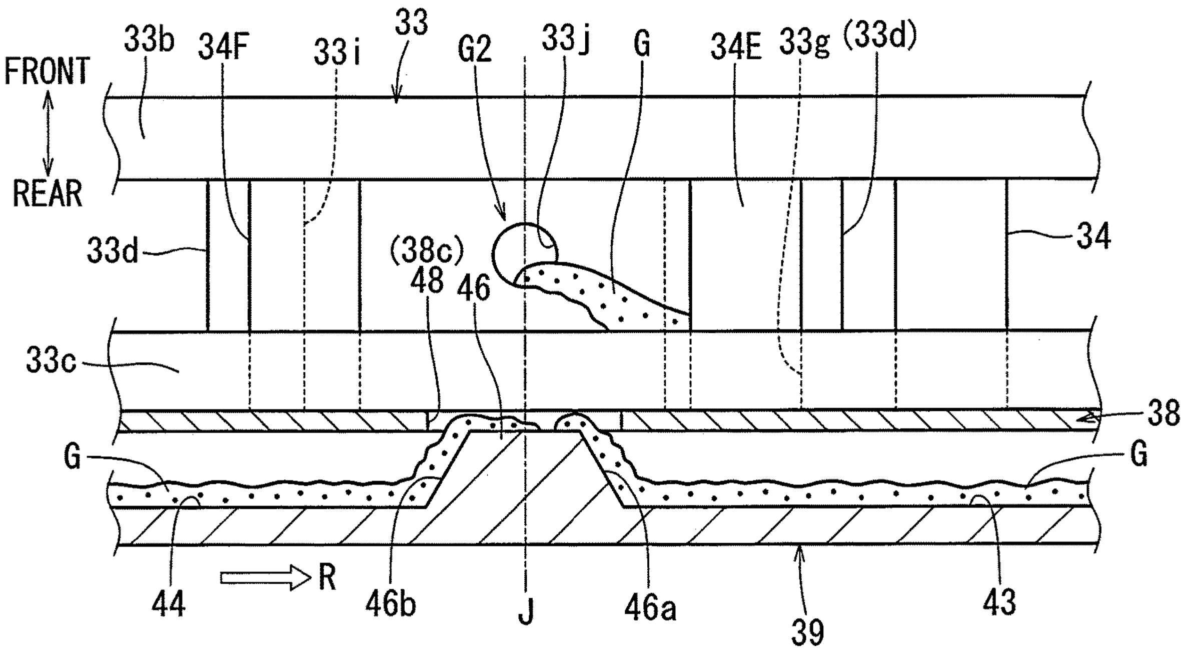
FIG. 11 is a longitudinal cross-sectional view of a second grease flow passage.

As shown in FIG. 7, the two grease reservoirs 43. 44 on the inner circumferential side of the holder 39 are partitioned from each other with the wall 46. As shown in FIG. 11, the wall 46 includes a tilting surface 46*a* on a frontward side in the rotation direction R and a tilting surface 46*b* on a rearward side in the rotation direction R. The tilting surface 46*a* and the tilting surface 46*b* are tilted relative to a depth direction of the grease reservoir 43, 44. Also, the tilting surface 46*a* and the tilting surface 46*b* are tilted toward a downstream direction of a grease flow passage (on a side of the communicating hole 48 of the cover 38).

As shown in FIGS. 8, 9 and 11, an oval recess 33*i* is formed on a rear surface of the rear flange 33*c* of the wheel 33. The recess 33*i* is formed to have a depth reaching the front portion of the coupling member 33*d* but not reaching the front flange 33*b*. A communicating hole 33*j* is formed at a middle of the recess 33*i* in a depth direction of the recess 33*i*. The communicating hole 33*j* is formed in an approximately circular shape and passes through the coupling member 33*d* in a radial direction of the coupling member 33*d*. The communicating hole 33*j* is open toward the inner circumferential side of the last engagement portion 34E.

As shown in FIG. 11, grease G flows from the grease reservoir 43, 44 to the cover communicating hole 48 via the tilting surface 46*a* and 46*b*. The grease G flowing to the cover communicating hole 48 flows toward the supporting hole 33*g* and the last engagement portion 34E via the recess 33*i* and the communicating hole 33*j*. Because of this configuration, the lubrication to the engagement portion 34E can be performed. The grease reservoir 43, 44, the tilting surface 46*a*, 46*b* of the wall 46, the cover communicating hole 48, the recess 33*i* and the communicating hole 33*j* form a second grease flow passage G2 for lubricating the engagement portion 34E.

As shown in FIG. 5, two magnets 40 are attached to a lower surface of the holder 39. The two magnets 40 are arranged along a circumferential edge of the holder 39. As shown in FIG. 3, a sensor 41 is attached to an outer surface of the mechanism case 35. A magnetism of each of the magnets 40 is detected by the sensor 41. Accordingly, a rotation position of the wheel 33 can be determined. A detection signal of the sensor 41 is input to the controller 8.

According to the above-described embodiment, the grease reservoir 42, 43, 44 are formed in the holder 39 on which the magnets 40 are arranged to detect the rotation position of the wheel 33. An adequate amount of grease G is stored in the grease reservoir 42, 43, 44. The grease G flows mainly to the engagement portion 34E from the grease reservoir 42, 43, 44 via the first grease flow passage G1 and the second grease flow passage G2. Accordingly, an adequate amount of grease G is applied to the engagement portion 34E and around the engagement portion 34E, thereby improving durability of the wheel 33.

According to the above-described embodiment, the wheel 33 includes the supporting hole 33*g* into which the engagement portion 34 is inserted. The first grease flow passage G1 includes the extension groove 33*f* extending from the supporting hole 33*g* formed on the rear surface of the wheel 33 that faces the holder 39. Accordingly, the grease G in the grease reservoir 42 is applied to the supporting hole 33*g*, into which the engagement portion 34E is inserted, and the engagement portion 34E via the extension groove 33*f*.

According to the above-described embodiment, the extension groove 33*f* extends in an arc-shape centered at a rotation center of the wheel 33 (motor shaft axis line J). The first grease flow passage G1 further includes the penetrating groove 33*h* that passes through the wheel 33 from the extension groove 33*f* to the inner circumferential surface of the supporting hole 33*g*. Accordingly, the grease G can be supplied to the supporting hole 33*g* and the engagement portion 34E more reliably via the penetrating groove 33*h*.

According to the above-described embodiment, the second grease flow passage G2 includes the recess 33*i* and the communicating hole 33*j*. The recess 33*j* is formed on the rear surface of the wheel 33 facing the holder 39. The communicating hole 33*j* communicates with the recess 33*i* and is open toward the engagement portion 34E. Accordingly, the grease G in the grease reservoir 43, 44 is applied to the supporting hole 33*g* and the engagement portion 34E via the recess 33*i* and the communicating hole 33*j* which are formed in the second grease flow passage G2.

According to the above-described embodiment, the tilting surfaces 45*a*, 46*a*, and 46*b* are formed on circumferential ends of the grease reservoirs 42, 43 and 44, respectively, so as to be tilted relative to the depth direction of the grease reservoirs 42, 43 and 44. Also, the tilting surface 45*a* extends along the first grease flow passage G1, and the tilting surfaces 46*a* and 46*b* extend along the second grease flow passage G2. Accordingly, the grease G in the grease reservoirs 42, 43 and 44 smoothly flows along the first flow passage G1 and the second flow passage G2 via the tilting surfaces 45*a*, 46*a* and 46*b*.

According to the above-described embodiment, the holder 39 that rotates integrally with the wheel 33 includes the magnet 40 for detecting the rotation position of the wheel 33. Accordingly, the rotation position of the wheel 33 can be detected by the magnet 40. The electric motor 31 is controlled based on the rotation position of the wheel 33.

According to the above-described embodiment, the cover 38 is arranged between the wheel 33 and the holder 39 to cover the grease reservoirs 42, 43 and 44. Accordingly, the cover 38 prevents the grease G from being leaked from the grease reservoirs 42, 43 and 44.

According to the above-described embodiment, the cover 38 includes the opening hole 47 that is open to the extension groove 33*f* of the wheel 33. The opening hole 47 forms a part of the first grease flow passage G1. Accordingly, the grease G in the grease reservoir 42 flows to the extension groove 33*f* via the opening hole 47 that forms a part of the first grease flow passage G1.

According to the above-described embodiment, the cover 38 includes the communicating hole 48 that is open to the recess 33*i* of the wheel 33. The communicating hole 48 forms a part of the second grease flow passage G2. Accordingly, the grease in the grease reservoirs 43 and 44 flows to the recess 33*i* via the cover communicating hole 48 that forms a part of the second grease flow passage G2.

The driving tool 1 according to the above-described embodiment may be modified in various ways. In the above embodiment, the driving tool 1 includes two flow passages, i.e., the first grease flow passage G1 and the second flow passage G2. Instead, the driving tool 1 may include either one of the first grease flow passage G1 and the second flow passage G2.

In the above embodiment, the driving tool 1 includes the first grease flow passage G1 and the second grease flow passage G2 in which the grease G flows toward the last engagement portion 34E. Instead, the driving tool 1 may include further flow passages for applying the grease to the other engagement portions 34 from the grease reservoirs.

In the embodiment, the above-discussed lubricating structure is applied to a gas-spring type driving tool 1. Instead, the lubricating structure may be applied to a mechanical-spring type driving tool in which a biasing force of a compression spring is used for a driving force.

The driving tool 1 in the embodiment is one example of the driving tool according to one aspect or other aspects of the present disclosure. The driving member t in the embodiment is one example of the driving member according to one aspect or other aspects of the present disclosure. The driver 2 in the embodiment is one example of the driver according to one aspect or other aspects of the present disclosure. The engagement portion 34 in the embodiment is one example of the engagement portion according to one aspect or other aspects of the present disclosure. The wheel 33 in the embodiment is one example of the wheel according to one aspect or other aspects of the present disclosure.

The electric motor 31 in the embodiment is one example of the electric motor according to one aspect or other aspects of the present disclosure. The holder 39 in the embodiment is one example of the holder according to one aspect or other aspects of the present disclosure. The magnet 40 in the embodiment is one example of the magnet according to one aspect or other aspects of the present disclosure. The grease reservoir 42, 43, 44 in the embodiment is one example of the grease reservoir according to one aspect or other aspects of the present disclosure. The first grease flow passage G1 and the second grease flow passage G2 in the embodiment are examples of the grease flow passage according to one aspect or other aspects of the present disclosure.

We claim:

1. A driving tool comprising:

a driver configured to move in a driving direction to drive a driving member;

a wheel configured to engage the driver, the wheel including a plurality of engagement portions;

an electric motor configured to rotate the wheel for moving the driver in a direction opposite to the driving direction via the plurality of engagement portions;

a holder attached to the wheel;

at least one grease reservoir formed in the holder; and at least one grease flow passage configured to connect the at least one grease reservoir and at least one of the plurality of engagement portions, the at least one of the plurality of engagement portions engaging the driver at a standby position, wherein the wheel includes supporting holes for inserting the plurality of engagement portions, and the at least one grease flow passage includes a first grease flow passage having an extension groove arranged on an outer surface of the wheel facing the holder and configured to extend from one of the supporting holes.

2. The driving tool according to claim 1, wherein:

the extension groove extends in an arc-shape centered at a rotation center of the wheel; and the first grease flow passage further includes a penetrating groove for penetrating the wheel from the extension groove along an inner circumferential surface of the one of the supporting hole.

3. The driving tool according to claim 1, wherein:

the at least one grease flow passage includes a second grease flow passage having a recess arranged on an outer surface of the wheel facing the holder and a first communicating hole connected to the recess, the first communicating hole being opened toward the at the least one of the plurality of engagement portions.

4. The driving tool according to claim 3, further comprising a cover between the wheel and the holder for covering the at least one grease reservoir, wherein the cover includes a second communicating hole configured to be opened to the recess of the wheel, the second communicating hole being a part of the second grease flow passage for flowing grease to the recess.

5. The driving tool according to claim 3, wherein:

the wheel includes a front flange, a rear flange and a coupling member, the front flange and the rear flange being integrally connected to each other via the coupling member; and the coupling member includes the first communicating hole.

6. The driving tool according to claim 1, wherein the at least one grease reservoir includes a tilting surface positioned at a circumferential end of the at least one grease reservoir so as to be tilted relatively to a depth direction of the at least one grease reservoir and extends along the at least one grease flow passage.

7. The driving tool according to claim 1, wherein the holder includes a magnet for detecting a rotation position of the wheel.

8. The driving tool according to claim 1, further comprising a cover between the wheel and the holder for covering the at least one grease reservoir, wherein the cover includes at least one hole being a part of the grease flow passage for flowing grease to the at least one of the plurality of engagement portions.

9. The driving tool according to claim 8, wherein:

the cover includes a plurality of holes, the plurality of holes being arranged so as to be asymmetrically arranged with respect to a rotation center of the cover; and the holder includes a cylindrical-shaped positioning protrusion positioned at a front surface of the holder and insertable to one of the plurality of holes.

10. The driving tool according to claim 1, further comprising a cover between the wheel and the holder for covering the at least one grease reservoir, wherein the cover includes an opening hole configured to be opened to the extension groove of the wheel, the opening hole being a part of the first grease flow passage for flowing grease to the extension groove.

11. The driving tool according to claim 10, wherein:

the at least one grease flow passage includes a second grease flow passage having a recess arranged on an outer surface of the wheel facing the holder and a first communicating hole connected to the recess, the first communicating hole being opened toward the at the least one of the plurality of engagement portions, and the cover includes a second communicating hole configured to be opened to the recess of the wheel, the second communicating hole being a part of the second grease flow passage for flowing the grease to the recess.

12. The driving tool according to claim 1, wherein the wheel includes a front flange, a rear flange and a coupling member, the front flange and the rear flange being integrally connected to each other via the coupling member.

13. The driving tool according to claim 12, wherein the plurality of engagement portions are positioned between the front flange and the rear flange.

14. The driving tool according to claim 1, wherein:

the wheel includes a front flange, a rear flange and a coupling member, the front flange and the rear flange being integrally connected to each other via the coupling member; and the rear flange includes the extension groove arranged on a rear-side surface of the rear flange, the extension groove being arc-shaped.

15. The driving tool according to claim 1, wherein:

the holder includes a plurality of grease reservoirs;

at least one grease reservoir is on an outer circumferential side of an outer surface of the holder; and at least one grease reservoir is on an inner circumferential side of the outer surface of the holder.

16. The driving tool according to claim 15, wherein the one of the plurality of engagement portions is positioned adjacent to the at least one grease reservoir on the outer circumferential side of the outer surface of the holder.

17. A driving tool comprising:

a driver configured to move in a driving direction to drive a driving member;

a wheel configured to engage the driver, the wheel including a plurality of engagement portions;

an electric motor configured to rotate the wheel for moving the driver in a direction opposite to the driving direction via the plurality of engagement portions;

a holder attached to the wheel, the holder including at least one grease reservoir; and at least one magnet arranged on the holder for detecting a rotation of the wheel.

18. A driving tool comprising:

a driver configured to move in a driving direction to drive a driving member;

a wheel configured to engage the driver, the wheel including a plurality of engagement portions;

an electric motor configured to rotate the wheel for moving the driver in a direction opposite to the driving direction via the plurality of engagement portions;

a holder attached to the wheel, the holder including a plurality of grease reservoirs arranged on outer and inner circumferential sides of an outer surface of the holder;

a plurality of grease flow passages configured to connect at least one of the plurality of grease reservoirs and at least one of the plurality of engagement portions, the at least one of the plurality of engagement positions configured to engage the driver at a standby position;

at least one magnet arranged along a circumferential edge of the holder for detecting a rotation of the holder; and at least one sensor for detecting a magnetism of the at least one magnet.

19. The driving tool according to claim 18, further comprising a controller for controlling the electric motor, the electric motor configured to receive one or more signals from the at least one sensor.

* * * * *